(12) United States Patent
Webster et al.

(10) Patent No.: US 8,852,458 B2
(45) Date of Patent: Oct. 7, 2014

(54) GLYCIDYL CARBAMATE COATINGS HAVING IMPROVED CORROSION RESISTANCE

(75) Inventors: Dean C. Webster, Fargo, ND (US); Roopashree Suryanarayana, Omaha, NE (US)

(73) Assignee: NDSU Research Foundation, Fargo, ND (US)

( * ) Notice: Subject to any disclaimer, the term of this patent is extended or adjusted under 35 U.S.C. 154(b) by 890 days.

(21) Appl. No.: 12/747,772

(22) PCT Filed: Dec. 12, 2008

(86) PCT No.: PCT/US2008/086616
§ 371 (c)(1),
(2), (4) Date: Sep. 29, 2010

(87) PCT Pub. No.: WO2009/076609
PCT Pub. Date: Jun. 18, 2009

(65) Prior Publication Data
US 2011/0049429 A1    Mar. 3, 2011

Related U.S. Application Data

(60) Provisional application No. 61/013,222, filed on Dec. 12, 2007.

(51) Int. Cl.
| | |
|---|---|
| C23F 11/00 | (2006.01) |
| C08G 59/00 | (2006.01) |
| C08G 59/40 | (2006.01) |
| C08G 59/50 | (2006.01) |
| C08G 59/38 | (2006.01) |
| C09D 5/08 | (2006.01) |
| C08G 59/22 | (2006.01) |
| C09D 163/00 | (2006.01) |
| C08L 63/00 | (2006.01) |

(52) U.S. Cl.
CPC ....... *C08G 59/38* (2013.01); *C09D 5/08* (2013.01); *C08G 59/226* (2013.01); *C08L 63/00* (2013.01); *C09D 163/00* (2013.01)
USPC ........... 252/392; 252/396; 252/403; 252/407; 252/182.13; 252/182.2; 252/182.21; 252/182.22; 252/182.27; 252/182.28; 252/183.11

(58) Field of Classification Search
USPC ......... 252/392, 396, 403, 407, 182.13, 182.2, 252/182.21, 182.22, 182.27, 182.28, 183.11
See application file for complete search history.

(56) References Cited

U.S. PATENT DOCUMENTS

| | | | |
|---|---|---|---|
| 3,440,230 A | | 4/1969 | Doss |
| 4,020,034 A | * | 4/1977 | Freiter .......................... 523/454 |

(Continued)

FOREIGN PATENT DOCUMENTS

| | | |
|---|---|---|
| WO | 99/03905 A1 | 1/1999 |
| WO | 03/060026 A1 | 7/2003 |
| WO | 2009/042999 A1 | 4/2009 |

OTHER PUBLICATIONS

"Novel Polyurethane Coating Technology through Glycidyl Carbamate Chemistry,", Peter A. Edwards et al., JCT Research, 2(7), 517-528 (2005).*

(Continued)

*Primary Examiner* — Joseph D Anthony
(74) *Attorney, Agent, or Firm* — J.A. Lindeman & Co., PLLC (57) ABSTRACT

This invention relates to coating compositions comprising a glycidyl carbamate functional resin, an epoxy resin, and an amine curing agent. The coating compositions have improved corrosion resistance, particularly on untreated steel substrates.

27 Claims, 7 Drawing Sheets

BGC COATINGS AFTER 240 HOURS OF EXPOSURE

(56) References Cited

U.S. PATENT DOCUMENTS

| | | | |
|---|---|---|---|
| 4,069,208 A * | 1/1978 | Hoeschele | 525/415 |
| 5,717,054 A | 2/1998 | Schultz | |
| 6,849,337 B2 * | 2/2005 | Ohrbom et al. | 428/413 |
| 2006/0289307 A1 * | 12/2006 | Yu et al. | 204/403.01 |
| 2008/0071022 A1 * | 3/2008 | Webster et al. | 524/591 |

OTHER PUBLICATIONS

"Preparation and Characterization of Cryogenic Adhesives. I. Glycidal-Terminated Polyurethan Resins", Chen, et al., J. Appl. Polym. Sci,, 51, 1199-1206 (1994).*

"Glycidyl-Terminated Polyurethane Modified Epoxy-Resins: Mechinical Properties, Adhesive Properties, and Morphology", Hsia, et al., J. Appl. Polym. Sci., 52, 1137-1151 (1994).*

Edwards et al., "Synthesis, characterization, and self-crosslinking of glycidyl carbamate functional resins," Prog. Org. Coat. 57:128-139 (2006).

International Search Report for PCT/US2008/086616 mailed Aug. 25, 2009.

International Preliminary Report on Patentability and Written Opinion for PCT/US2008/086616 dated Jun. 15, 2010.

* cited by examiner

SELECTED GC COATINGS AFTER 1080 HOURS OF EXPOSURE

US 8,852,458 B2

GLYCIDYL CARBAMATE COATINGS HAVING IMPROVED CORROSION RESISTANCE

STATEMENT REGARDING GOVERNMENT FUNDING

This invention was supported by the Department of the Navy under Grant number Luna Innovations/US NAVY No. N00024-05-C-4139 and NDSU/Luna Innovations No. 861-NVY-2S/NDSU. The government has certain rights in this invention.

CROSS REFERENCE TO RELATED APPLICATIONS

This application claims priority under 35 U.S.C. §119 to U.S. provisional application Ser. No. 61/013,222, filed Dec. 12, 2007, which is incorporated herein by reference.

FIELD OF THE INVENTION

This invention relates to the field of glycidyl carbamate coatings that are blended with an epoxy resin. The coating compositions have improved corrosion resistance, particularly on untreated steel substrates.

BACKGROUND OF THE INVENTION

Glycidyl carbamate functional oligomers and polymers can be prepared by the reaction of a polyfunctional isocyanate compound and glycidol. See, e.g., Doss, R. C. U.S. Pat. No. 3,440,230, 1969; Freiter, E. R. U.S. Pat. No. 4,020,034, 1977; Ohrbom, W. H., December, T. S., U.S. Pat. No. 6,849,337, 2005; and Hoeschele, G. K. U.S. Pat. No. 4,069,208, 1978. Alcohol-modified glycidyl carbamate resins are described by PCT Application PCT/US08/78,112, filed Sep. 29, 2008. These document as well as others cited below are incorporated by references.

Glycidyl carbamate functional compounds will undergo self-crosslinking at elevated temperatures (ca. 150° C.). See, e.g., Peter A. Edwards, Grant Striemer, Dean C. Webster, "Synthesis, Characterization, and Self-Crosslinking Of Glycidyl Carbamate Functional Resins," *Prog. Org. Coat,* 57. 128-139 (2006).

Glycidyl carbamate functional oligomers can be crosslinked with multifunctional amines at either ambient or elevated temperatures to form crosslinked coatings with a good combination of properties. See, e.g., Peter A. Edwards, Grant Striemer, Dean C. Webster, "Novel Polyurethane Coating Technology through Glycidyl Carbamate Chemistry," *JCT Research,* 2(7), 517-528 (2005).

Glycidyl carbamates have been described in the synthesis of glycidyl terminated polyurethane resins. See Chen, et al., *J. Appl. Polym. Sci.,* 51, 1199-1206 (1994). In Chen, linear polymers made by reacting an excess of a diisocyanate with a polyol, then reacting the residual isocyanate groups with glycidol to form the glycidyl carbamate end groups. The polymers were then crosslinked with amines and their properties as adhesives evaluated.

Epoxy resins modified with glycidyl terminated polyurethanes was disclosed in Hsia, et al., *J. Appl. Polym. Sci.,* 52, 1137-1151 (1994). In Hsia, the glycidyl terminated polyurethanes are linear aromatic polymers terminated with glycidyl carbamate groups, similar to those described in Chen. A bisphenol-A glycidyl ether epoxy resin was used.

However, no reports of the corrosion performance of coatings prepared from glycidyl carbamate functional compounds have been found in the literature. Thus, what is needed in the art is a way of improving the corrosion resistance properties of these glycidyl carbamate functional compounds, particular when such compounds are used as coating compositions on substrates. This invention answers that need.

SUMMARY OF THE INVENTION

This invention relates to a novel coating composition having improved corrosion-resistant properties. The coating composition of the invention comprises a glycidyl carbamate resin blended with at least one epoxy resin and at least one curing agent, preferably an amine curing agent.

This invention also provide a method for preparing a corrosion-resistant coating composition and methods of coating substrates with a corrosion-resistant coating composition of the invention. The substrate treated with the coating formulation of the glycidyl carbamate compound containing the aromatic epoxy resin has improved corrosion resistance over untreated substrates.

DESCRIPTION OF THE INVENTION

This invention relates to a novel coating composition having improved corrosion-resistant properties. Such coating composition comprises a glycidyl carbamate resin blended with at least one epoxy resin and at least one curing agent.

Glycidyl carbamate (GC) resins may be used in the coating compositions of the invention. In particular, GC resins of formulas (I), (II), (III), (IV) and (V) shown below, may be used.

(I)

X represents either a glycidyl group:

or an alkyl group based on an alcohol, represented as:

wherein at least two of the X moieties are represented by the glycidyl group. Preferably X is a glycidyl group.

R is independently an optionally substituted, divalent $C_1$-$C_{15}$ alkyl, an optionally substituted divalent $C_3$-$C_{15}$ cycloalkyl, or a divalent substituent selected from the group consisting of

For compounds of formulas (I), (II), (III) and (IV), R may be a divalent $C_3$-$C_8$ alkyl. For example, R is preferably —$(CH_2)_6$— when X is a glycidyl group. For compounds of formula (V), R is preferably a divalent $C_6$-$C_{10}$ alkyl or one of the six groups depicted above.

For the alcohol-modified GC compounds of formulas (I)-(V), n may range from 0 to 50 and preferably ranges from 0 to 10, and more preferably from 0 to 5. In certain embodiments, n ranges from 1-5, and in other embodiments, n is 0. When n is other than 0, the modifying alcohol group is an ether alcohol group containing one or more ethyleneoxy groups. GC-functional compounds of formulas (I)-(V) where n is 0 represent a separate embodiment of the invention.

$R_1$ is independently an optionally substituted $C_1$-$C_{22}$ alkyl, preferably a $C_1$-$C_{15}$ alkyl. For embodiments of the invention where n is 1 or more, $R_1$ is preferably $C_1$-$C_6$, and more preferably $C_1$-$C_3$. For embodiments of the invention where n is 0, $R_1$ is preferably $C_3$-$C_{10}$, more preferably a $C_4$-$C_8$ alkyl, and most preferably a n-butyl, iso-butyl, or a 2-ethylhexyl group.

In formula (IV), the variable m ranges from 1-15, preferably 1-7, and most preferably 1-4. This includes trifunctional allophanate resins (where m=1) and tetrafunctional allophanate resins (where m=2).

Preferred compounds include those represented by formulas (Ia), (IIa) and (Va):

The term "alkyl" includes straight and branched alkyl groups. As indicated above, R and $R_1$ may be substituted with any number of substituents or functional moieties. Examples of substituents include, but are not limited to, halo substituents, e.g. F; Cl; Br; or I; a hydroxyl group; a $C_1$-$C_6$ alkoxy group, e.g, —$OCH_3$, —$OCH_2CH_3$, or —$OCH(CH_3)_2$; a $C_1$-$C_6$ haloalkyl group, e.g., —$CF_3$; —$CH_2CF_3$; or —$CHCl_2$; $C_1$-$C_6$ alkylthio; amino; mono and dialkyl amino groups; —$NO_2$; —CN; a sulfate group, and the like.

Any epoxy resin known in the art may be used in the coating compositions of the invention. The epoxy resin can be any glycidyl ether or glycidyl ester resin having at least two epoxy groups per molecule. Epoxy resins are typically synthesized by reacting a hydroxyl or carboxylic acid functional compound with epichlorohydrin. Aromatic epoxy resins are made using bisphenol-A, bisphenol-F or novolac phenolic resins. Preferred are the aromatic epoxy resins from bisphenol-A. More preferred are those aromatic epoxy resins based on bisphenol-A glycidyl ethers. Most preferred are the liquid bisphenol-A glycidyl ether resins. Examples of useful epoxy resins are diglycidyl ether resins based on bisphenol-A such as the EPON Resins and modifiers available from Hexion Specialty Chemicals or DER resins available from Dow Chemical Company. EPON epoxy resins provided by Hexion Specialty Chemicals include families of liquid resins, solid resins, solutions, blends and other multifunctional resins based on a variety of backbones. One preferred embodiment of the invention uses EPON Resin 828, which is a liquid epoxy resin based on bisphenol A diglycidyl ether.

The equivalent ratio of glycidyl carbamate resin to epoxy resin in the coating composition of the invention may range from about 9:1 to about 1:9. Particular ratios that may be used include 9:1, 3:1, and 1:1. In a preferred embodiment, the equivalent ratio may range from about 3:2 to about 2:3. The stoichiometry of the equivalent ratio may be based on epoxy equivalent weight, EEW.

The curing agent serves to crosslink the coating compositions of the invention. The curing agent may be any curing agent known in the art to cure (or crosslink) epoxy resins. The curing agent may be used in the manner and amount known in the art. Suitable curing agents for use in the coating compositions of the invention include those typically employed with epoxy resins, such as aliphatic, araliphatic and aromatic amines, polyamides, amidoamines and epoxy-amine adducts. The coating may be cured at ambient or elevated (e.g. about 80° C.) temperatures. Amine curing agents typically allow the coating to cure at ambient temperatures.

Suitable amine curing agents are those which are soluble in a coating composition of the invention. Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononae; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl)cyclohexane; and 1-cyclohexyl-3,4-dimino-cyelohexane. As exemplary araliphatic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis(p-aminobenzyl)aniline; diethyltoluenediamine; and m-phenylene diamine. The amine curing agents may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Preferably, amine curing agents used with the coating formulations of the invention are PACM (bis(para-aminocyclohexyl)methane), diethylene triamine (DETA), and 4,4'-methylene dianiline (MDA). Stoichiometry ratios of amine to oxirane of the aqueous coating compositions may be based on amine hydrogen equivalent weight (AHEW) and on weight per epoxide (WPE). A formulation of 1:1 was based on one epoxide reacted with one amine active hydrogen.

A coating composition of the invention may further contain at least one coating additive in order to, for example, enhance the composition's coating efficiency. Examples of suitable coating additives include, but are not limited to, leveling and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; antisettling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Another embodiment of the invention relates to a method of preparing a corrosion-resistant coating compositions. The method comprises the step of blending a glycidyl carbamate resin with at least one epoxy resin and at least one curing agent, preferably an amine curing agent. Suitable glycidyl carbamate resins, epoxy resin and amine curing agent are the same as described above for those suitable for the coating compositions of the invention.

The coating compositions of the invention may be used to form coatings on the following substrates: wood, steel, aluminum, plastic, and glass. The invention also provides methods for coating such substrates by applying the coating composition to the substrate. The coating may be applied by methods know in the art such as drawdown, conventional air-atomized spray, airless spray, roller, brush. The coating may be cured at ambient temperatures or above.

The coating formulation containing the aromatic epoxy resin has improved corrosion resistance over the coating not containing the aromatic epoxy resin. More particularly, blending glycidyl carbamate functional compounds with an aromatic epoxy resin results in coatings that have excellent corrosion performance on untreated steel substrates. In certain embodiment, the coating substrate treated with the above depicted coating method was subjected to salt spray testing for corrosion performance according to ASTM B117, and such treated substrate exhibits corrosion resistance after 240 hours or more of exposure to salt spray testing. Such treated substrate can exhibit corrosion resistance when the time of exposure to salt spray testing increases to 480 hours or more in a more preferred embodiment, and 1080 hours or more in a most preferred embodiment.

EXAMPLES

Glycidyl carbamate functional compounds were synthesized from the reaction of the respective isocyanate compounds with glycidyl according to previously reported experimental methods (either Edwards paper above). The compounds synthesized are listed in Table 1.

TABLE 1

Structures of Glycidyl Carbamate Functional Compounds Prepared

| Short Name | Structure | CAS Number |
|---|---|---|
| IGC |  | 125025-77-6 |

TABLE 1-continued

Structures of Glycidyl Carbamate Functional Compounds Prepared

| Short Name | Structure | CAS Number |
|---|---|---|
| BGC |  | 530159-26-3<br>530159-28-5<br>("homopolymer") |
| IPDI-GC |  | 85665-62-9 |
| TMXDI-GC |  | N/A |
| TMHDI-GC |  | N/A |

Coating Formulations

The glycidyl carbamate resins were mixed with three different crosslinkers from Air Products, Ancamide 2050, Ancamide 805, and Ancamide 2523. The stoichiometric ratio was one amine active hydrogen to one glycidyl carbamate epoxide. Coatings were prepared on cold rolled steel substrates which had been degreased with xylenes before use.

Coatings were also made where the glycidyl carbamate resins were blended with EPON Resin 828 (Hexion Specialty Chemicals, Columbus, Ohio) and crosslinked with PACM (bis(p-aminocyclohexyl)methane). The resins were blended with EPON resins at three different ratios and crosslinked with PACM. Glycidyl carbamate to epoxy blending was 90:10 ("EPON A"), 75:25 ("EPON B" and 50:50 ("EPON C"). Three different formulation of glycidyl carbamate to epoxy are shown in Table 2.

Coatings were tested for tack free time, solvent resistance, hardness, reverse impact, conical mandrel flexibility, and gloss according to standard ASTM methods. Konig pendulum hardness was measured following ASTM D 4366, with the values reported in seconds(s). Coating reverse impact resistance was determined using ASTM D 2794 with a Gardener impact tester. The maximum drop height was 43 inch with a drop weight of four pounds. Crazing or loss of adhesion was noted and inch pounds were determined at film finish failure. Samples that did not fail were noted as >172 in-lbs. A conical mandrel test was also used to determine the flexibility of the coatings (ASTM D 522). Coatings that did not crack during the flexibility test were noted as pass, those that had any signs of defects were noted as fail. Methyl ethyl ketone (MEK) double rubs were used to assess the development of cure. A 26-ounce hammer with five-layers of cheesecloth wrapped around the hammerhead was soaked in MEK. After 100 double rubs the hammer was rewet with MEK. Once mar was achieved the number of double rubs was noted. The cross hatch adhesion of coating was evaluated using Gardco cross hatch adhesion instrument following ASTM D 3359. The gloss values were measured according to ASTM D 523.

Corrosion performance was performed for salt spray testing according to ASTM B117. This is a continuous salt fog at 35° C. Coatings cast on steel panels were cured in the oven at 80° C. for an hour. Back and edges of the panel were taped and were scribed to obtain a crosscut at the centre with a razor blade. The electrolyte solution is 49.97 grams of sodium chloride per 1-liter de-ionized water.

TABLE 2

Formulation for GC resin/EPON resin/Amine coatings

| GC-RESIN in weight % | EEW | EPON Resin 828 in weight % | EEW (Epoxy Equivalent Weight) | AMINE | AHEW (Amine Hydrogen Equivalent Weight) (g/equiv) | Amount of amine (g) |
|---|---|---|---|---|---|---|
| BGC | 242 | | 188 | PACM | 53.55 | |
| 90 | | 10 | | | | 22.53 |
| 75 | | 25 | | | | 23.27 |
| 50 | | 50 | | | | 24.85 |
| IGC | 244 | | | PACM | 53.55 | |
| 90 | | 10 | | | | 22.56 |
| 75 | | 25 | | | | 23.48 |
| 50 | | 50 | | | | 25.02 |
| TMXDI-GC | 254 | | | PACM | 53.55 | |
| 90 | | 10 | | | | 30.73 |
| 75 | | 25 | | | | 30.29 |
| 50 | | 50 | | | | 29.56 |
| TMHDI-GC | 236 | | | PACM | 53.55 | |
| 90 | | 10 | | | | 23.087 |
| 75 | | 25 | | | | 23.92 |
| 50 | | 50 | | | | 25.32 |
| IPDI-GC | 230 | | | PACM | 53.55 | |
| 90 | | 10 | | | | 23.36 |
| 75 | | 25 | | | | 24.14 |
| 50 | | 50 | | | | 25.32 |

TABLE 3

Properties of coatings from GC resins and Ancamide 2050.

| GC Resin | Gloss | Thickness (microns) | Konig pendulum Hardness (sec) | Pencil Hardness | MEK double rubs | Reverse impact | Cross hatch adhesion | Tack Free Time in minutes |
|---|---|---|---|---|---|---|---|---|
| BGC | 20°-20.4<br>60°-53.6<br>85°-46.6 | 47 | 34 | F | 17 | 72 | 5 B | 188 |
| IGC | 20°-23.3<br>60°-54.7<br>85°-39.7 | 36 | 32 | 3 B | 18 | >90 | 5 B | 196 |
| TMHDI-GC | 20°-125.3<br>60°-141.8<br>85°-99.7 | 48 | 39 | H | 16 | >90 | 5 B | 220 |
| IPDI-GC | 20°-38.5<br>60°-88.6<br>85°-78.6 | 91 | 175 | H | 110 | 4 | 0 B | 175 |
| TMXDI-GC | 20°-116.8<br>60°-140.0<br>85°-99.2 | 87 | 117 | B | 85 | 4 | 5 B | 185 |

TABLE 4

Properties of coatings from GC resins and Ancamide 2353.

| GC Resin | Gloss | Thickness (microns) | Konig pendulum Hardness (Sec) | Pencil Hardness | MEK double rubs | Reverse impact | Cross hatch adhesion | Tack free time in minutes |
|---|---|---|---|---|---|---|---|---|
| BGC | 20°-107.0<br>60°-126.3<br>85°-99.6 | 88 | 122 | B | >400 | 80 | 5 B | 165 |
| IGC | 20°-98.1<br>60°-126.5<br>85°-93.8 | 70 | 19 | B | 150 | >90 | 2 B | 170 |

TABLE 4-continued

Properties of coatings from GC resins and Ancamide 2353.

| GC Resin | Gloss | Thickness (microns) | Konig pendulum Hardness (Sec) | Pencil Hardness | MEK double rubs | Reverse impact | Cross hatch adhesion | Tack free time in minutes |
|---|---|---|---|---|---|---|---|---|
| TMHDI-GC | 20°-125.9<br>60°-140.6<br>85°-99.7 | 56 | 28 | H | 21 | 10 | 5 B | 189 |
| IPDI-GC | 20°-120.8<br>60°-138.0<br>85°-99.9 | 65 | 196 | H | >400 | 4 | 0 B | 178 |
| TMXDI-GC | 20°-70.4<br>60°-114.4<br>85°-87.2 | 56 | 42 | B | 26 | 5 | 5 B | 160 |

TABLE 5

Properties of coatings from GC resins and Ancamide 805.

| GC Resin | Gloss | Thickness (microns) | Konig pendulum Hardness (Sec) | Pencil Hardness | MEK double rubs | Reverse impact | Cross hatch adhesion | Tack free time in minutes |
|---|---|---|---|---|---|---|---|---|
| BGC | 20°-34.7<br>60°-83.3<br>85°-82.0 | 97 | 122 | B | 42 | 70 | 5 B | 192 |
| IGC | 20°-33.5<br>60°-85.0<br>85°-87.6 | 11.2 | 19 | HB | 25 | >90 | 2 B | 200 |
| TMHDI-GC | 20°-107.0<br>60°-134.9<br>85°-94.7 | 28 | 28 | 2 B | 10 | 20 | 5 B | 178 |
| IPDI-GC | 20°-32.4<br>60°-75.6<br>85°-67.3 | 40 | 196 | H | 180 | 4 | 0 B | 167 |
| TMXDI-GC | 20°-45.0<br>60°-95.7<br>85°-73.6 | 82 | 42 | 2 B | 19 | 5 | 5 B | 210 |

TABLE 6

Properties of coatings from GC Resin/Epoxy Blends

| GC Resin:Epoxy | Gloss | Konig pendulum hardness | Pencil hardness | Cross hatch adhesion | Reverse impact | Thickness (microns) | MEK double rubs | Tack free time in minutes |
|---|---|---|---|---|---|---|---|---|
| BGC A = 90:10 | 20°-72.8<br>60°-119.0<br>85°-90.8 | 174 | F | 5 B | 5 | 98 | 256 | 176 |
| B = 75:25 | 20°-112.9<br>60°-130.1<br>85°-98.7 | 208 | H | 5 B | 4 | 92 | >400 | 182 |
| C = 50:50 | 20°-116.0<br>60°-133.5<br>85°-96.9 | 238 | F | 5 B | 5 | 68 | >400 | 168 |
| TMXDI GC A | 20°-114.6<br>60°-123.1<br>85°-98.2 | 118 | H | 2 B | 4 | 102 | 82 | 145 |
| B | 20°-102.8<br>60°-121.0<br>85°-97.9 | 156 | H | 5 B | 4 | 154 | 105 | 187 |
| C | 20°-94.5<br>60°-120.0<br>85°-97.1 | 182 | H | 2 B | 4 | 63 | 55 | 192 |
| TMHDI-GC A | 20°-90.5<br>60°-118.0<br>85°-96.1 | 115 | H | 5 B | 5 | 42 | 25 | 186 |
| B | 20°-112.5<br>60°-121.0<br>85°-98.1 | 210 | F | 5 B | 4 | 45 | 33 | 148 |

TABLE 6-continued

Properties of coatings from GC Resin/Epoxy Blends

| GC Resin:Epoxy | Gloss | Konig pendulum hardness | Pencil hardness | Cross hatch adhesion | Reverse impact | Thickness (microns) | MEK double rubs | Tack free time in minutes |
|---|---|---|---|---|---|---|---|---|
| C | 20°-108.9<br>60°-123.3<br>85°-97.5 | 202 | H | 5 B | 4 | 54 | 65 | 172 |
| IPDI-GC A | 20°-122.5<br>60°-137.0<br>85°-97.7 | 195 | H | 5 B | 4 | 46 | >400 | 184 |
| B | 20°-109.5<br>60°-130.0<br>85°-93.4 | 222 | H | 5 B | 5 | 65 | >400 | 176 |
| C | 20°-104.3<br>60°-129.8<br>85°-95.3 | 221 | F | 5 B | 4 | 92 | >400 | 198 |
| IGC A | 20°-111.6<br>60°-123.8<br>85°-97.5 | 110 | B | 5 B | 5 | 72 | 71 | 145 |
| B | 20°-115.0<br>60°-123.7<br>85°-98.9 | 160 | B | 5 B | 5 | 91 | 58 | 164 |
| C | 20°-16.6<br>60°-47.2<br>85°-44.0 | 135 | 2 B | 2 B | 10 | 77 | 49 | 178 |

Results and Discussion

Coatings physical properties are shown in Tables 3-6.

Resins crosslinked with Ancamide 805, Ancamide 2050, Ancamide 2353 and PACM along with resins blended with epoxy resin with EPON A resin, 90:10 (glycidyl carbamate: epoxy), EPON B resin, 75:25 (glycidyl carbamate: epoxy) and EPON C resin, 50:50 (glycidyl carbamate: epoxy) formulations is also shown in FIGS. 1-5 after 240 hours of salt spray testing.

Coatings from BGC (FIG. 1) are corroded with all crosslinkers but has excellent corrosion resistance with blends of EPON A resin and EPON B resin. So, BGC coatings blended with 10% and 25% of epoxy resin gives very good corrosion resistance. Coatings from IGC (FIG. 2) showed very poor resistance to corrosion with all Ancamide crosslinkers except for 2353. IGC gave excellent corrosion resistance with EPON resin blends. TMHDI-GC (FIG. 3) resin had very poor resistance to corrosion compared to the other GC resins, but the coatings with the EPON resin blends were better than the coatings without the epoxy resin. TMXDI-GC (FIG. 4) gave excellent corrosion resistance with epoxy blends and also with Ancamide 2050. IPDI-GC (FIG. 5) had fair corrosion performance and corrosion resistance was improved with EPON resin blends.

Figure 1:
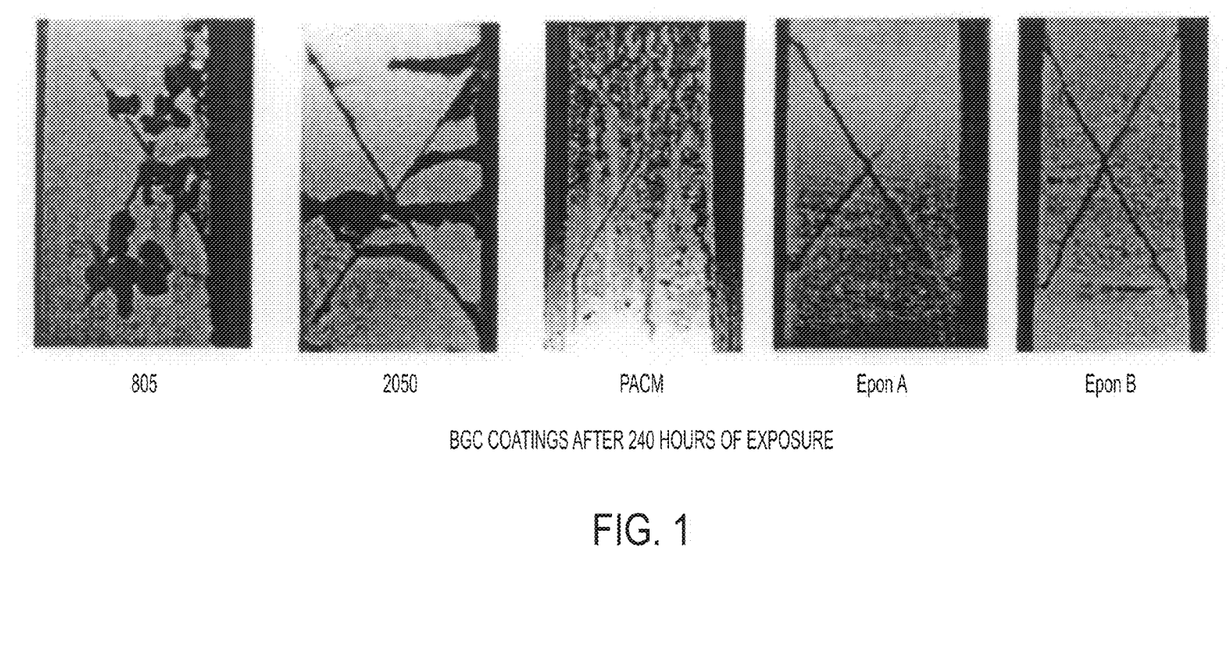
FIG. 1 depicts BGC coatings after 240 hours of exposure as described in the examples.
Figure 2:
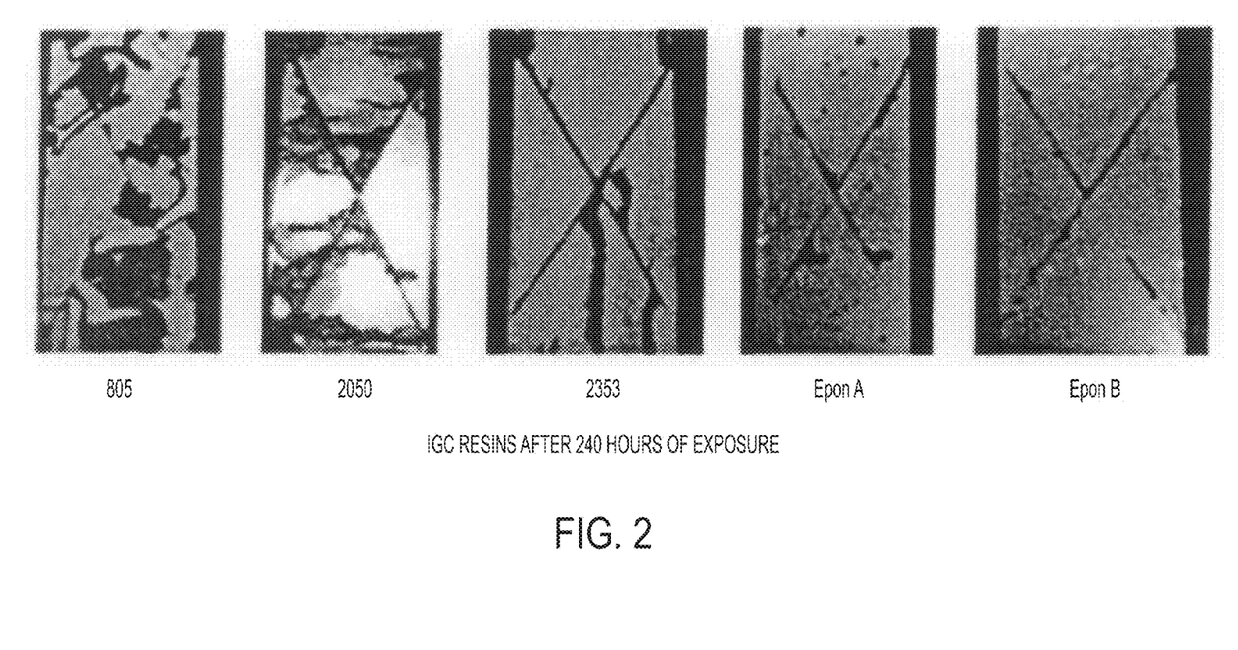
FIG. 2 depicts IGC resins after 240 hours of exposure as described in the examples.
Figure 3:
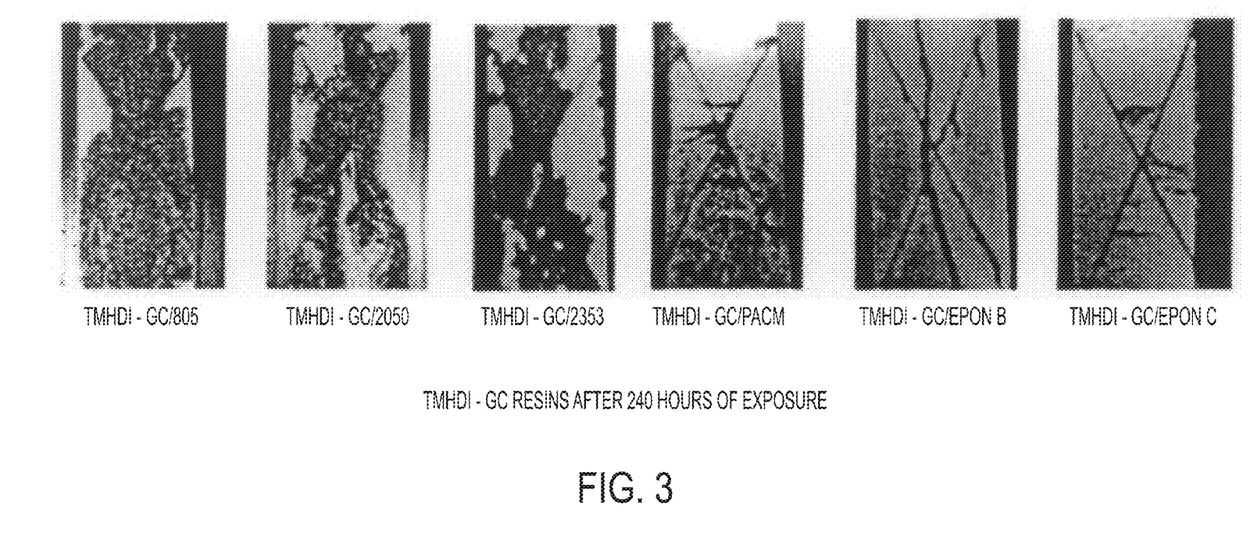
FIG. 3 depicts TMHDI-GC resins after 240 hours of exposure as described in the examples.
Figure 4:
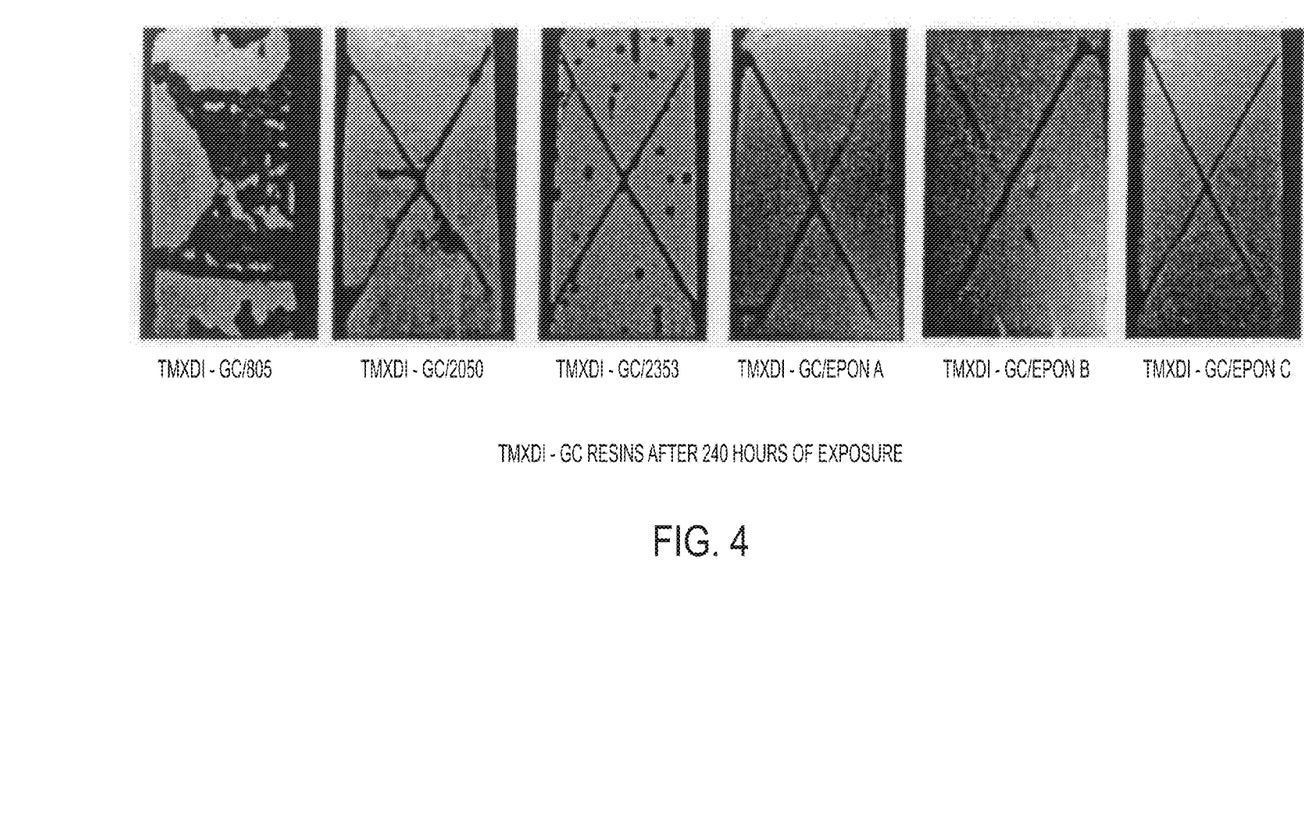
FIG. 4 depicts TMXDI-GC resins after 240 hours of exposure as described in the examples.
Figure 5:
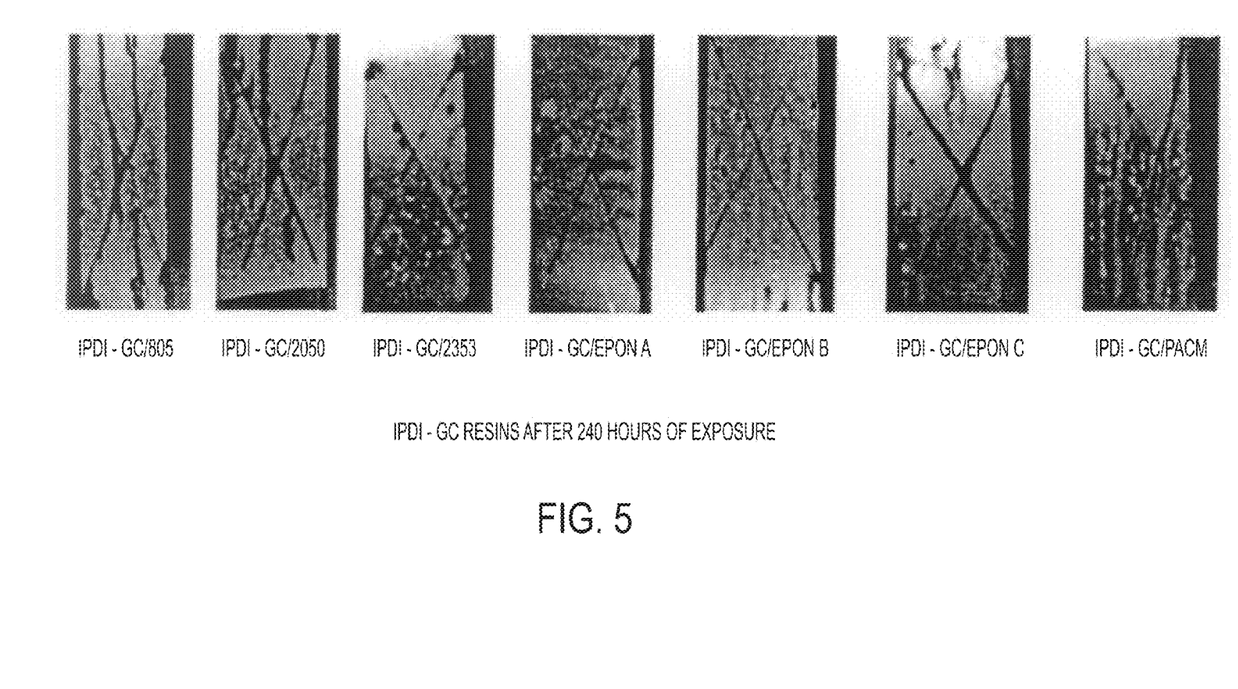
FIG. 5 depicts IPDI-GC resins after 240 hours of exposure as described in the examples.
Figure 6:
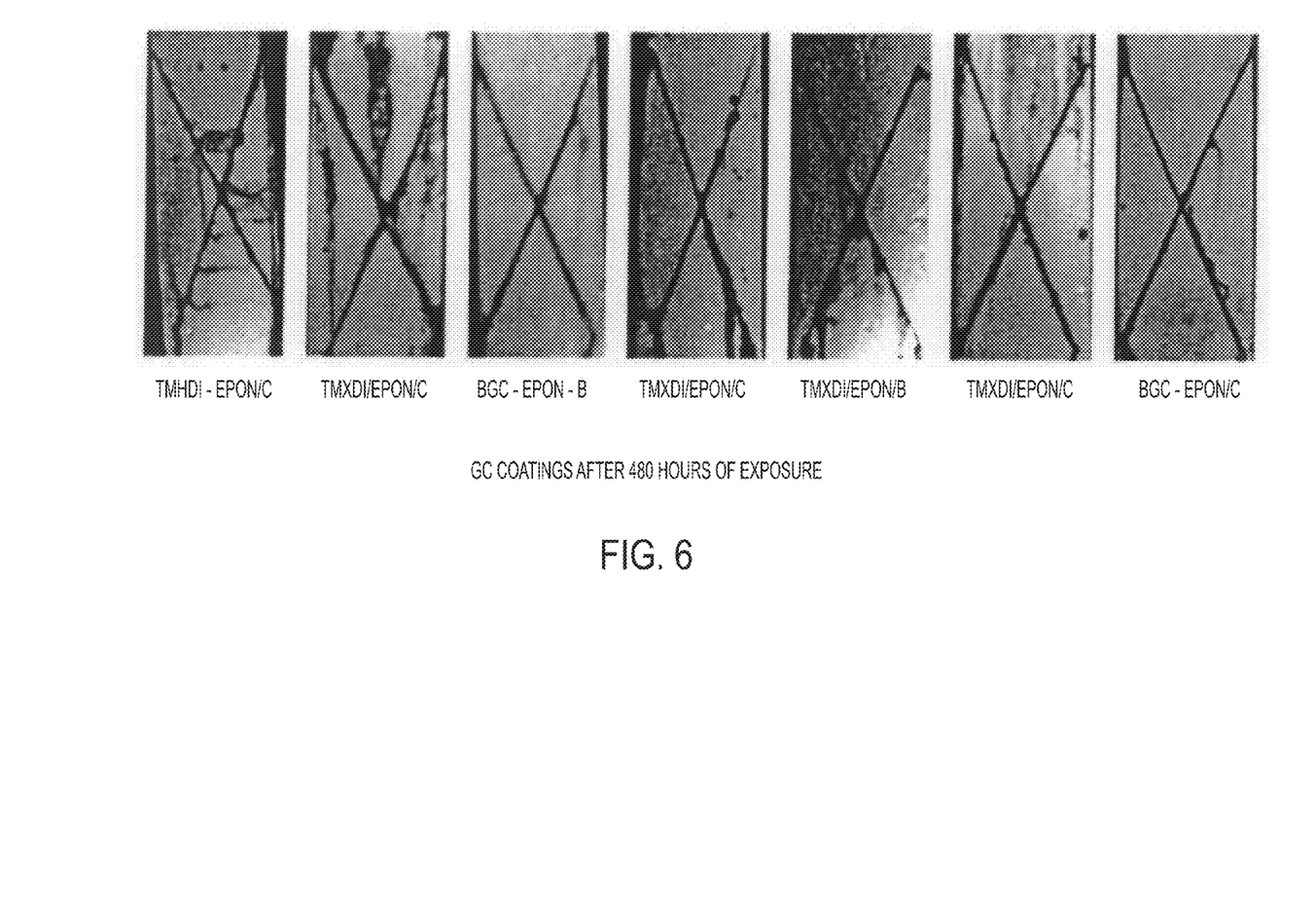
FIG. 6 depicts GC coatings after 480 hours of exposure as described in the examples.
Figure 7:
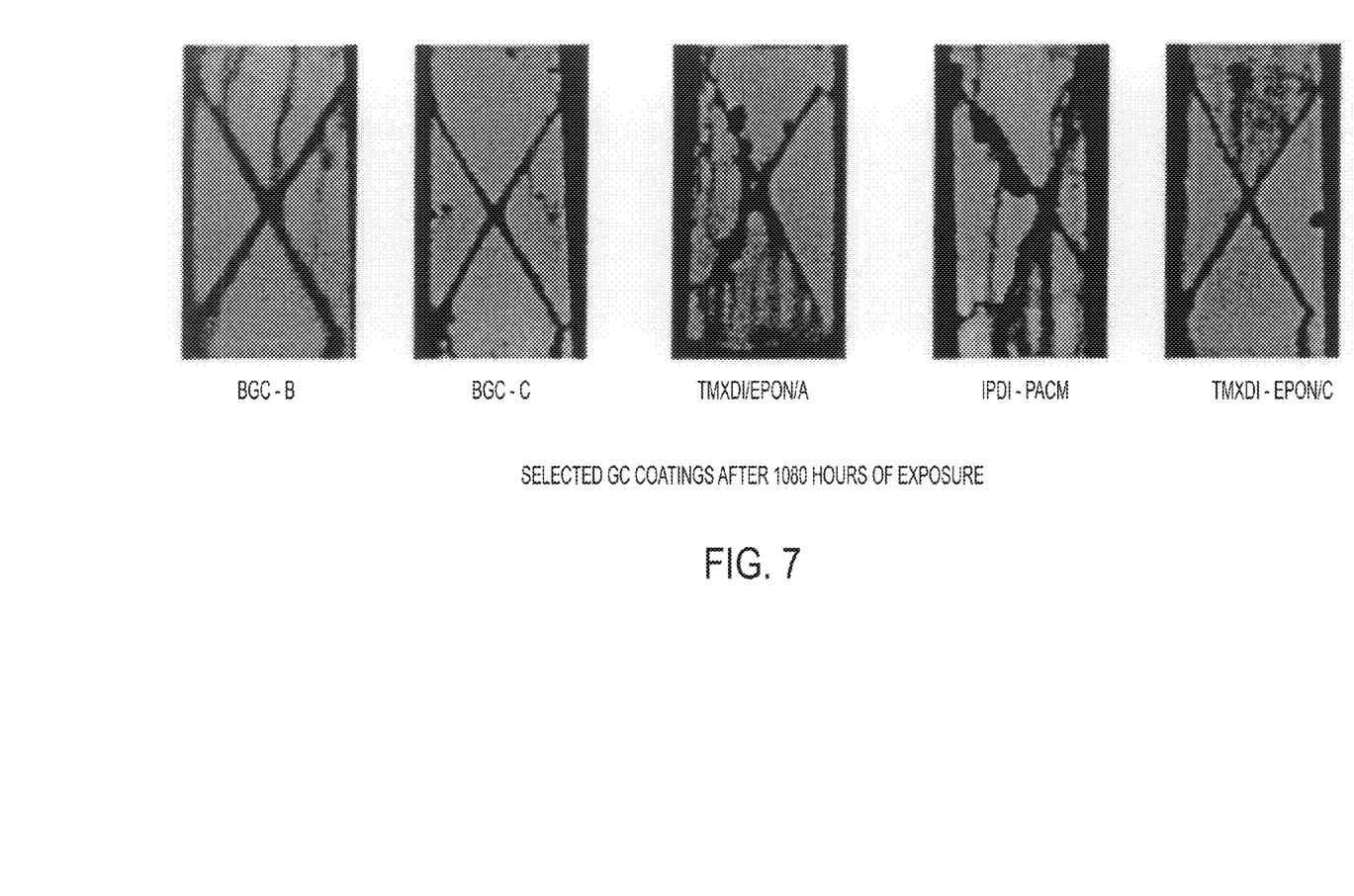
FIG. 7 depicts selected GC coatings after 1080 hours of exposure as described in the examples.

Selected coatings were subjected to additional salt spray testing. GC coatings blended with EPON resin show good corrosion resistance even after 480 hours of exposure (FIG. 6). BGC blended with EPON resin shows excellent corrosion resistance compared to TMXDI-GC and TMHDI-GC. Blending with just 10% of epoxy resin has increased the corrosion resistance of GC coatings significantly. BGC blended with 50% of EPON resin shows better resistance to corrosion after 1080 hours of exposure whereas TMXDI-GC and IPDI-GC coatings start to corrode more (FIG. 7).

Glycidyl carbamate coatings on blending with epoxy resin gives excellent corrosion resistance on non-treated cold-rolled steel panels. IGC, BGC, TMXDI-GC and IPDI-GC give better corrosion resistance with PACM, 2353, 2050 than 805. TMHDI-GC shows very poor resistance to corrosion. All resins shows excellent resistance to corrosion with EPON resin blends. BGC and TMXDI resin has very good corrosion resistance with EPON resin blends. The corrosion performance of GC resins is in the order:

BGC>IGC>TMXDI-GC>IPDI-GC>TMHDI-GC and the amine crosslinkers can be ranked as follows:

PACM>Ancamide 2353>Ancamide 2050>Ancamide 805>Jeffamine D-400.

We claim:

1. A liquid coating composition having improved corrosion-resistant properties, comprising a blend of an aliphatic glycidyl carbamate resin having greater than two glycidyl carbamate groups, at least one epoxy resin and at least one amine curing agent soluble in the coating composition.

2. The coating composition of claim 1, wherein the epoxy resin is aromatic.

3. The coating composition of claim 2, wherein the epoxy resin contains at least two epoxy groups.

4. The coating composition of claim 3, wherein the epoxy resin is a bis phenol diglycidyl ether.

5. The coating composition of claim 1, wherein the blend of glycidyl carbamate resin:epoxy resin ranges from about 9:1 to about 1:9.

6. The coating composition of claim 1, wherein the blend of glycidyl carbamate resin:epoxy resin ranges from about 2:3 to about 3:2.

7. The coating composition of claim 1, wherein the amine curing agent is selected from the group consisting of PACM (bis(para-aminocyclohexyl)methane), diethylene triamine (DETA), 4,4'-methylene dianiline (MDA), Ancamide 2353, Ancamide 2050, Ancamide 805, Jeffamine D-400, and combinations thereof.

8. The coating composition of claim 1, wherein glycidyl carbamate resin is a compound selected from formula (I), (II), (III), or (IV):

wherein R is independently an optionally substituted, divalent $C_1$-$C_{15}$ alkyl, an optionally substituted divalent $C_3$-$C_{15}$ cycloalkyl, or a divalent substituent selected from the group consisting of X represents either the glycidyl group:

or an alkyl group based on an alcohol, represented as:

wherein at least two of the X moieties are represented by the glycidyl group;

n ranges from 0-50;

m ranges from 1-15; and $R_1$ is independently an optionally substituted $C_1$-$C_{22}$ alkyl.

9. The coating composition of claim 8, wherein, for compounds of formulas (I), (II), (III) and (IV), R is a divalent $C_3$-$C_8$ alkyl.

10. The coating composition of claim 9, wherein X is:

11. The coating composition of claim 10, wherein, R is —(CH$_2$)O—.

12. The coating composition of claim 8, wherein n ranges from 0-10.

13. The coating composition of claim 12, wherein n ranges from 1-5.

14. The coating composition of claim 13, wherein $R_1$ is a $C_1$-$C_6$ alkyl.

15. The coating composition of claim 14, wherein R is —(CH$_2$)$_6$— and $R_1$ is a $C_1$-$C_3$ alkyl.

16. The coating composition of claim 12, wherein n is 0.

17. The coating composition of claim 16, wherein $R_1$ is a $C_3$-$C_{10}$ alkyl.

18. The coating composition of claim 17, wherein R is —$(CH_2)_6$— and $R_1$ is a $C_4$-$C_8$ alkyl.

19. The coating composition of claim 8, wherein the glycidyl carbamate compound is represented by formula (I) or (II).

20. The coating composition of claim 8, wherein the glycidyl carbamate compound is represented by formula (IV).

21. The coating composition of claim 20, wherein m ranges from 1-4.

22. A method of preparing a liquid coating composition having corrosion-resistant properties, comprising:
blending an aliphatic glycidyl carbamate resin having greater than two glycidyl carbamate groups with at least one epoxy resin and at least one amine curing agent which is soluble in the coating composition.

23. A method of coating a substrate with a corrosion-resistant composition, comprising the step of applying a liquid coating composition to a substrate, wherein the coating composition comprises an aliphatic glycidyl carbamate resin having greater than two glycidyl carbamate groups blended with at least one epoxy resin and at least one amine curing agent soluble in the coating composition.

24. The method of claim 23, wherein the substrate is a steel substrate.

25. The method of claim 23, wherein the substrate exhibits corrosion resistance after 240 hours or more of exposure to salt spray testing in accordance with ASTM B117.

26. The method of claim 25, wherein the substrate exhibits corrosion resistance after 480 hours or more of exposure to salt spray testing.

27. The method of claim 26, wherein the substrate exhibits corrosion resistance after 1080 hours or more of exposure to salt spray testing.

* * * * *